United States Patent
Kobayashi

(10) Patent No.: US 12,548,108 B2
(45) Date of Patent: Feb. 10, 2026

(54) IMAGE PROCESSING APPARATUS, IMAGE PROCESSING METHOD, AND STORAGE MEDIUM THAT GENERATE A PERSPECTIVE PROJECTION IMAGE FROM A WIDE-ANGLE IMAGE

(71) Applicant: CANON KABUSHIKI KAISHA, Tokyo (JP)

(72) Inventor: Masaaki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 18/068,565

(22) Filed: Dec. 20, 2022

(65) Prior Publication Data

US 2023/0206386 A1 Jun. 29, 2023

(30) Foreign Application Priority Data

Dec. 28, 2021 (JP) ................. 2021-214448

(51) Int. Cl.
 *G06T 3/047* (2024.01)
 *G06T 3/12* (2024.01)
 (Continued)

(52) U.S. Cl.
 CPC ............... *G06T 3/047* (2024.01); *G06T 5/92* (2024.01); *G06T 7/11* (2017.01); *G06T 7/70* (2017.01);
 (Continued)

(58) Field of Classification Search
 CPC ... G06T 3/047; G06T 7/11; G06T 7/70; G06T 5/92; G06T 11/00; G06T 2207/20132
 See application file for complete search history.

(56) References Cited

U.S. PATENT DOCUMENTS

2018/0341811 A1* 11/2018 Bendale .................... G06T 7/70
2020/0409482 A1* 12/2020 Yin ......................... G06F 3/0383
2022/0165021 A1* 5/2022 Kawaguchi ............... G06T 3/08

FOREIGN PATENT DOCUMENTS

JP 2008-131405 A 6/2008
JP 2014-085897 A 5/2014
(Continued)

OTHER PUBLICATIONS

Ogldev "Tutorial 12: Perspective Projection", ogldev.org/www/tutorial12/tutorial12.html, published Nov. 8, 2015.*
(Continued)

*Primary Examiner* — Ross Varndell
*Assistant Examiner* — Nhut Huy Pham
(74) *Attorney, Agent, or Firm* — Venable LLP

(57) ABSTRACT

An image processing apparatus configured to generate a perspective projection image from a wide-angle image. The image processing apparatus includes one or more memories storing instructions and one or more processors executing the instructions to function as a first generation unit configured to generate the perspective projection image from the wide-angle image based on a first parameter related to a predetermined viewing angle, and an output unit configured to output the generated perspective projection image. The perspective projection image includes region information indicating an image region corresponding to the predetermined viewing angle in the wide-angle image.

10 Claims, 14 Drawing Sheets

(51) Int. Cl.
  *G06T 5/92*  (2024.01)
  *G06T 7/11*  (2017.01)
  *G06T 7/70*  (2017.01)
  *G06T 11/00*  (2006.01)
  *H04N 13/117*  (2018.01)
  *H04N 13/366*  (2018.01)

(52) U.S. Cl.
  CPC .... *G06T 11/00* (2013.01); *G06T 2207/20132* (2013.01)

(56) References Cited

FOREIGN PATENT DOCUMENTS

| JP | 2021-140676 A | | 9/2021 | |
| KR | 20200075249 A | * | 6/2020 | ......... G02B 27/0172 |
| WO | 2020-162218 A1 | | 8/2020 | |

OTHER PUBLICATIONS

Realmax Qian youtube channel, "Realmax Qian is an AR headset with an ultra-wide field of view.6DOF tracking", https://www.youtube.com/watch?v=dKxsdPO43Q4, published Aug. 18, 2020 (Year: 2020).*

Realmax AR youtube channel, "Realmax Qian is an AR headset with an ultra-wide field of view.6DOF tracking", https://www.youtube.com/watch?v=dKxsdPO43Q4 (Year: 2020).*

C. Cruz-Neira, et al., "Surround-screen projection-based virtual reality", Aug. 1-6, 1993, SIGGRAPH 93: 20th Annual Conference on Computer Graphics and Interactive Techniques; Anaheim, CA, USA (8 pages).

N. Kishishita, et al., "Poster: Investigation on the peripheral visual field for information display with real and virtual wide field-of-view see-through HMDs", Mar. 16, 2013, 2013 IEEE Symposium on 3D User Interfaces (3DUI), IEEE, pp. 143 and144 (2 pages).

Extended European Search report issued on May 22, 2023, in corresponding European Patent Application No. 22214843.9 (9 pages).

Makoto Shohara, et al., "Special Feature a New Visual Audio Experience Chapter 2: Omnidirectional Imaging", 2015, The journal of the Institute of Image Information and Television Engineers, vol. 69, No. 7, pp. 652 to 657 (6 pages).

Notice of Reasons for Refusal issued Jul. 1, 2025, in corresponding Japanese Patent Application No. 2021-214448, with English translation (12 pages).

* cited by examiner

IMAGE PROCESSING APPARATUS, IMAGE PROCESSING METHOD, AND STORAGE MEDIUM THAT GENERATE A PERSPECTIVE PROJECTION IMAGE FROM A WIDE-ANGLE IMAGE

BACKGROUND OF THE INVENTION

Cross Reference to Priority Application

This application claims the benefit of Japanese Patent Application No. 2021-214448 filed Dec. 28, 2021, which is hereby incorporated by reference herein in its entirety.

FIELD OF THE INVENTION

The present disclosure relates to an image processing technique to convert a wide-angle image into a perspective projection image.

DESCRIPTION OF THE RELATED ART

In recent years, a head-mounted display (HMD) type XR information processing terminal has started to become popular. XR is a term that collectively calls virtual reality (VR), augmented reality (AR), and mixed reality (MR). Among HMDs, there are HMDs of various viewing angle specifications depending on the cost and application. Additionally, in general, an ultrawide-angle image such as a fisheye image (also called an omnidirectional image, and the like) having an angle of view of one hundred eighty degrees or more, that is obtained by imaging using a fisheye lens with a wide angle of view, is often used as image contents for the HMD. An image actually displayed on the HMD is a limited image region corresponding to a viewing angle of the HMD out of the wide-angle image. To this end, it is necessary to cut out an image region corresponding to the viewing angle determined for each model of the HMD from the wide-angle image and to convert the image region into a perspective projection image developed in a plane (see Makoto Shohara, et al., Special Feature A New Visual Audio Experience Chapter 2: Omnidirectional Imaging (The journal of the Institute of Image Information and Television Engineers Vol. 69, No. 7, 2015) pages 652 to 657). In this case, the perspective projection image developed in a plane is an image that is obtained by using a normal lens and is proper to be viewed by a human and to be displayed on a plane display.

During editing of the image contents for the HMD, it is necessary to figure out whether a necessary object fits within the image to be displayed on the HMD. However, the image region cut out for the HMD has a narrow angle of view and it is difficult to capture the object, and the wide-angle image is improper to be viewed by a human on a normal plane display. Thus, there is a problem that it is difficult to confirm the perspective projection image generated from a partial image region corresponding to a predetermined angle of view of the wide-angle image.

SUMMARY OF THE INVENTION

A technique of the present disclosure is an image processing apparatus configured to generate a perspective projection image from a wide-angle image, including a parameter obtainment unit that obtains a first parameter related to a predetermined viewing angle, a first generation unit that generates the perspective projection image from the wide-angle image based on the first parameter, and an output unit that outputs the generated perspective projection image to a display device, in which the perspective projection image includes region information indicating an image region corresponding to the predetermined viewing angle in the wide-angle image.

Further features of the present invention will become apparent from the following description of exemplary embodiments with reference to the attached drawings.

DESCRIPTION OF THE EMBODIMENTS

Embodiment 1

Here is described an image processing apparatus that can convert an ultrawide-angle image into a planar development image while highlighting an image region corresponding to a predetermined angle of view in the ultrawide-angle image on a perspective projection image. Note that, for the sake of explanatory convenience, a wide-angle image with a wider angle may be called the ultrawide-angle image in some cases. A projection method used to generate a fisheye image, which is the ultrawide-angle image, includes stereographic projection, equidistant projection, equisolid angle projection, and the like. On the other hand, the projection method used to generate the planar development image is a central projection method. An image generated by the central projection method is called the perspective projection image. Thus, projection conversion is necessary to obtain the perspective projection image as the planar development image from the fisheye image.

Figure 1:
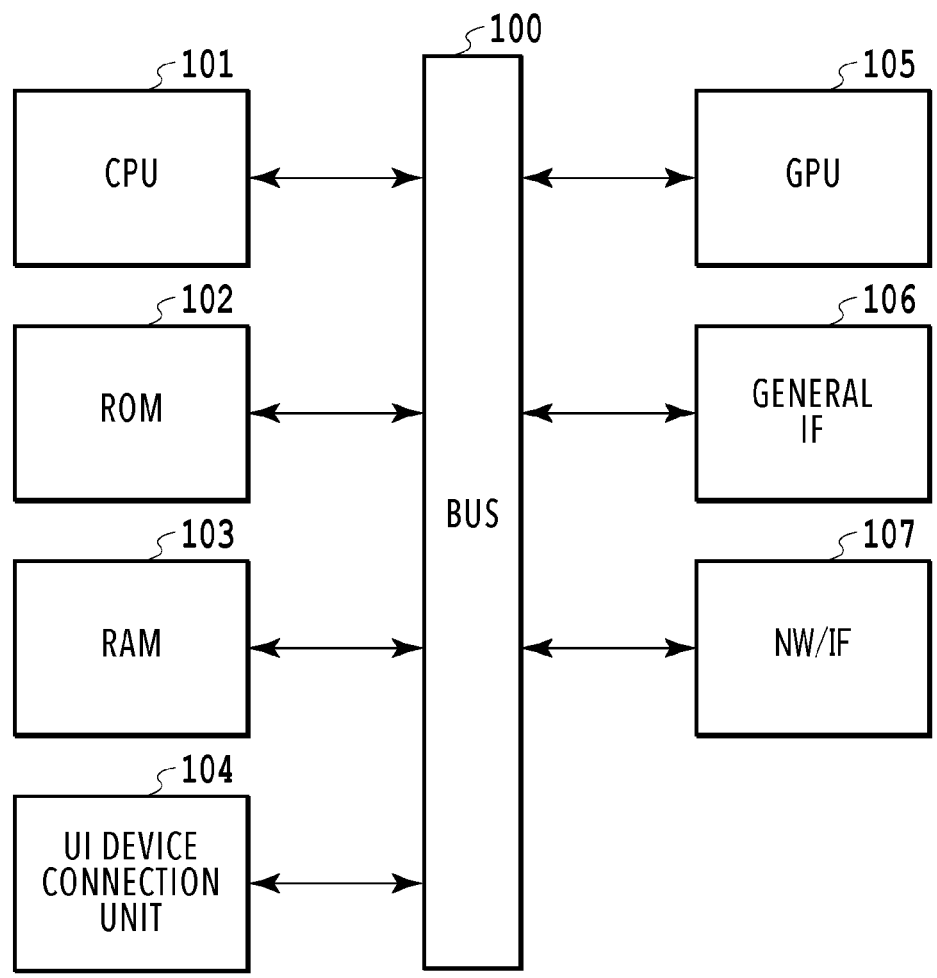
FIG. 1 is a diagram describing a hardware configuration example of an image processing apparatus according to an embodiment.

FIG. 1 illustrates a diagram describing a hardware configuration example of an image processing apparatus according to the present embodiment.

A bus 100 allows for mutual data communication between constituents included in the image processing apparatus. A CPU 101 executes software including a program for performing image processing and controls the overall image processing apparatus. A ROM 102 records the program executed by the CPU 101 and various data. A RAM 103 loads the program and the data stored in the ROM 102 in the activation of the present image processing apparatus to function as a working area of the CPU 101 and stores an obtained image and a generated image. A user interface (UI) device connection unit 104 can accept input of a keyboard, a mouse, and orientation information on an HMD. A GPU 105 can perform image processing and output image data to a display device such as the HMD and a standard plane display. A general interface (IF) 106 allows for connection with a capture device and input of a camera image. A network (NW)/IF 107 can be connected to a network with or without wire, and can input and output data to and from an external device through the network. In the present embodiment, descriptions are given assuming that an image is obtained from the ROM 102 and the UI device connection unit 104. An image may however, be inputted in real time from the capture device through the general IF 106, or an image may be obtained by way of the network through the NW/IF 107. Additionally, an image generated by the image processing apparatus of the present embodiment can be incorporated as a part of a UI function, as needed, to be displayed on a display or outputted to a file.

Figure 14:
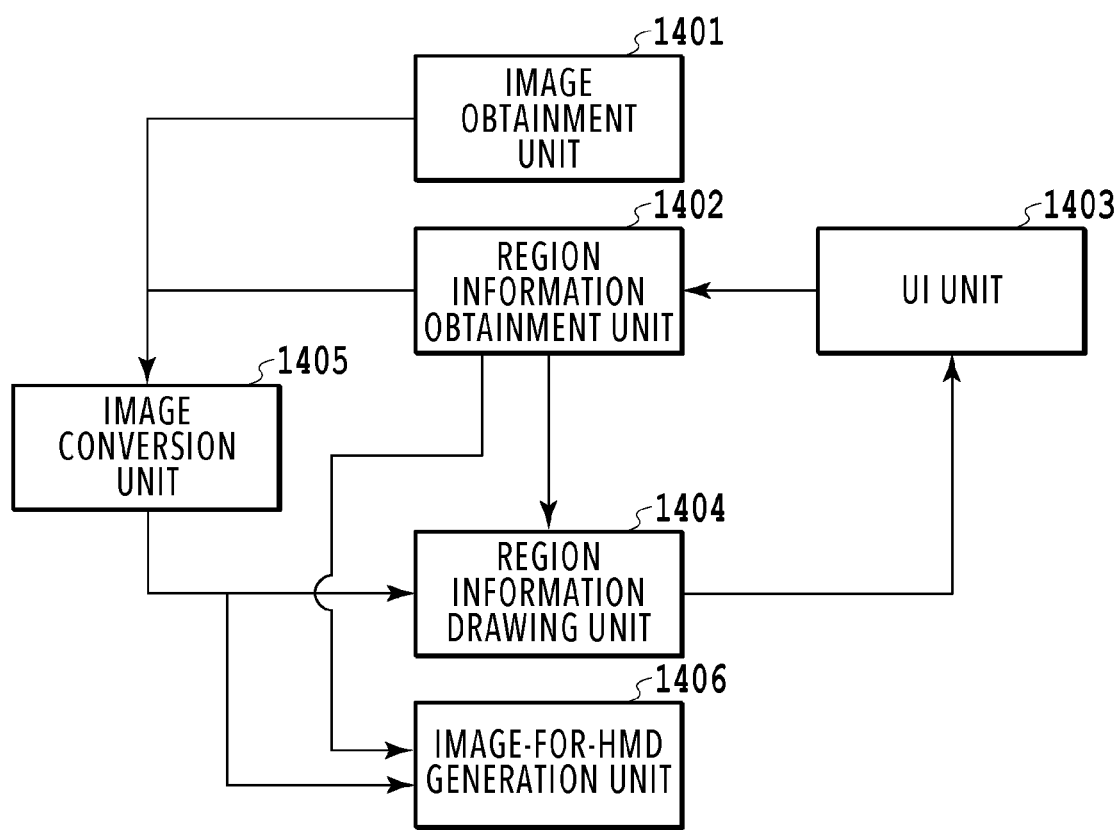
FIG. 14 is a diagram describing a software configuration example of the image processing apparatus according to the embodiment.

FIG. 14 illustrates a diagram describing a software configuration example of the image processing apparatus according to the present embodiment. An image obtainment unit 1401 obtains an ultrawide-angle image including angle of view information from the ROM 102 and the NW/IF 107. A region information obtainment unit 1402 obtains a size of a perspective projection image, a parameter related to an optical axis direction and an angle of view of a virtual camera, and information related to a visual field region that is superimposed and drawn on the perspective projection image from the ROM 102, the NW/IF 107, and a UI unit 1403, described later. The UI unit 1403 generates a UI screen, outputs the UI screen including an image outputted by a region information drawing unit 1404, described later, to an image device, and obtains a user input that is inputted through the UI screen. An image conversion unit 1405 generates the perspective projection image by projection conversion of the ultrawide-angle image based on the size of the perspective projection image and the optical axis direction, and the angle of view of the virtual camera obtained by the region information obtainment unit 1402. The region information drawing unit 1404 superimposes and draws the information indicating the visual field region obtained by the region information obtainment unit 1402 on the perspective projection image and outputs the information to the UI unit 1403. An image-for-HMD generation unit 1406 cuts out an image region corresponding to the visual field region obtained by the region information obtainment unit 1402 from the perspective projection image, generates an image for the HMD, and outputs the image to the HMD.

In a coordinate system of an image treated in the present embodiment, a width and a height of the image are $W_h$ and $h_h$, respectively, an X coordinate at the left end of the image is $-W_h/2$, an X coordinate at the right end of the image is $W_h/2$, a Y coordinate at the top end of the image is $-h_h/2$, and a Y coordinate at the bottom end of the image is $h_h/2$, where an image center is the origin. Additionally, each pixel forming the image has RGB color channels, and a pixel value of each pixel includes a value of each RGB color channel.

Figure 2:
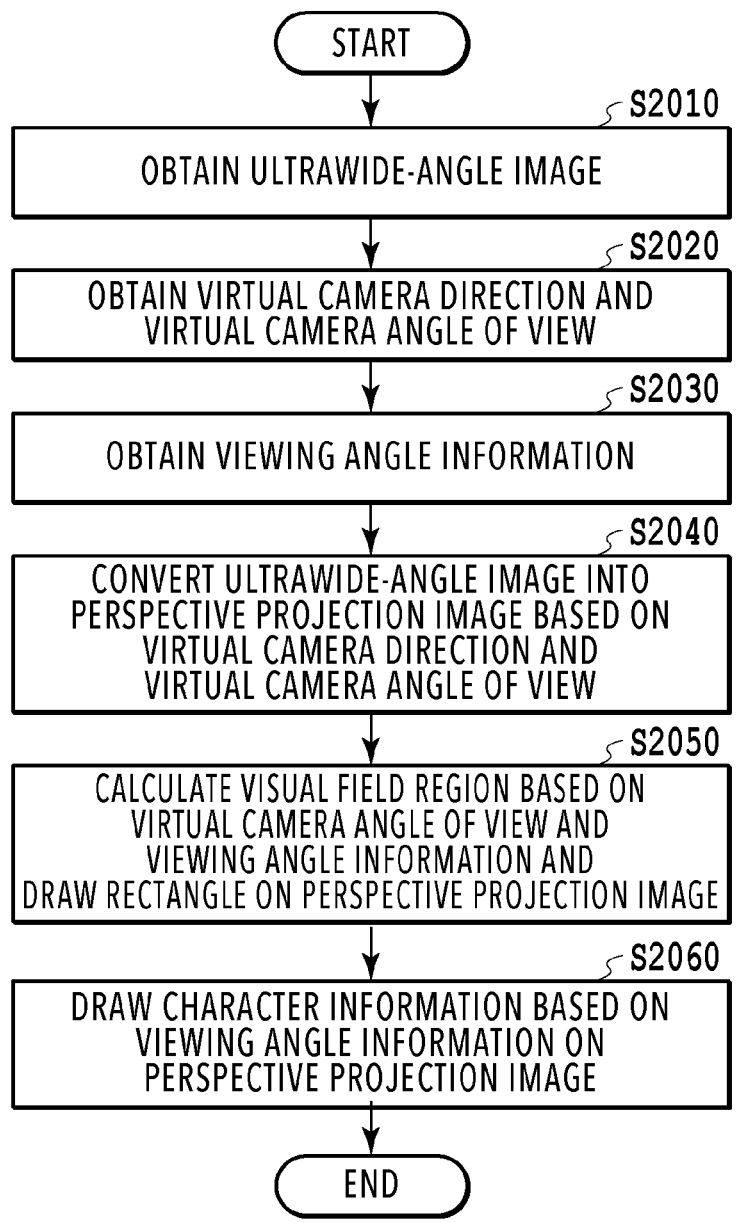
FIG. 2 is a flowchart of generating a perspective projection image in an embodiment 1.

FIG. 2 illustrates a flowchart describing processing of generating the perspective projection image for each frame in the embodiment 1. In this case, the steps are executed sequentially in a direction of an arrow illustrated in FIG. 2, unless otherwise stated. However, as long as there is no dependency in an input and an output relationship of data between the steps, the steps can be executed in a different order. Additionally, although the CPU 101 executes each step, a part of the processing, such as drawing processing may be performed by the GPU 105. An image generated by the present procedure is displayed on a display connected through the GPU 105. If a display frame rate of the inputted image is 60 fps, reading, generation, and display of 60 images are performed per second.

In S2010, the image obtainment unit 1401 obtains the ultrawide-angle image. In the present embodiment, a fisheye image obtained by using a fisheye lens of an equidistant projection method having an angle of view of up to one hundred eighty degrees is inputted as the ultrawide-angle image. Note that, optical distortion is removed by digital image processing from the fisheye image obtained as the ultrawide-angle image in this case. In the present embodiment, descriptions are given assuming that a radius of a lens circle of the ultrawide-angle image is r' and a width and a height of the fisheye image are 2r'+1.

In S2020, the region information obtainment unit 1402 obtains the optical axis direction and the angle of view of the virtual camera for defining an image for confirmation that is set for the ultrawide-angle image. In the present embodiment, an example of obtaining the optical axis direction and the angle of view of the virtual camera from the UI unit 1403 of an application is described. In an initial state, the optical axis direction of the virtual camera is a front direction of the obtained ultrawide-angle image, and the angle of view of the virtual camera is one hundred twenty degrees (sixty degrees each to the right and left). As a method of obtaining those parameters of the virtual camera, a movement amount to the top and bottom and right and left obtained by dragging the mouse is a change amount to the top and bottom and right and left in the optical axis direction of the virtual camera, and a value obtained by adding the change amount to the above-described initial value is obtained. Additionally, a value obtained by changing the optical axis direction of the virtual camera by ten degrees each by clicking top and bottom and right and left buttons is obtained. Moreover, the angle of view of the virtual camera can be increased and decreased by rotating a scroll wheel of the mouse. Note that, the virtual camera is a virtual camera that is capable of obtaining a virtual viewpoint image expressing a view from a designated virtual viewpoint as a captured image and is different from an actually disposed image capturing device. The virtual camera is a concept for conveniently describing the virtual viewpoint according to generation of the virtual viewpoint image. The optical axis direction and the angle of view of the viewpoint in virtual image capturing that are generated based on the fisheye image and the designated virtual viewpoint can be expressed as the optical axis direction and the angle of view of the virtual camera. Note that, a position of the virtual camera is a position of the image capturing device of the obtained ultrawide-angle image.

In S2030, the region information obtainment unit 1402 obtains predetermined viewing angle information. In the present embodiment, as viewing angle information of the HMD, sixty degrees (thirty degrees each to the top and bottom and right and left) as a steady observation viewing angle is obtained from data stored in the ROM 102, and the like, in advance. Note that, a viewing angle of a human has various classifications. An effective visual field in which observation is made only with eye movement and specific information can be captured immediately is within about fifteen degrees each to the right and left, about eight degrees to the top, and about twelve degrees to the bottom. A viewing angle at which it is possible to make observation effortlessly with eye movement and head movement is called a steady observation visual field and is within thirty to forty five degrees each to the right and left, twenty to thirty degrees to the top, and twenty five to forty degrees to the bottom. In contrast to the steady observation visual field, a viewing angle that allows for only a discrimination capability of determining the existence of presented information but that affects a sense of space coordinate of a human is called an induced visual field with thirty to one hundred degrees each to the right and left and twenty to eighty five degrees each to the top and bottom.

In S2040, based on the optical axis direction and the angle of view of the virtual camera obtained in S2020, the image conversion unit 1405 converts the fisheye image obtained as the ultrawide-angle image in S2010 into the perspective projection image as the image for confirmation. A width of the perspective projection image is w, a height is h, the optical axis direction of the virtual camera is $(\varphi_x, \varphi_y)$, the angle of view of the virtual camera is 2a degrees (a degrees each to the top and bottom and right and left), a coordinate value is (x, y), and a coordinate value of the fisheye image is (x', y'). Additionally, an image height of a pixel indicated by an angle is $(\theta_x, \theta_y)$. $(\theta_x, \theta_y)$ is obtained based on the following equations in a case when the fisheye image and the perspective projection image have the same value. Note that, in the present embodiment, h=1080 and w=1920.

$$r = \max(w, h)/2 \tag{1}$$

$$y = r \cdot \frac{\tan(\theta_y - \phi_y)}{\tan(a)} \tag{2}$$

$$x = r \cdot \frac{\tan(\theta_x - \phi_x)}{\tan(a)} \tag{3}$$

$$y' = r' \cdot \frac{\theta_y}{180} \tag{4}$$

$$x' = r' \cdot \frac{\theta_x}{180} \tag{5}$$

$$y' = r' \cdot \frac{a\tan(y \cdot \tan(a)/r) + \phi_y}{r} \tag{6}$$

$$x' = r' \cdot \frac{a\tan(x \cdot \tan(a)/r) + \phi_x}{r} \tag{7}$$

Note that, r is a distance from the center of the perspective projection image to an image end, and r' is a radius of a lens circle of the fisheye image. Additionally, max (w,h) is a function that outputs a greater one out of w and h. A pixel value in each coordinate on the perspective projection image after conversion is calculated based on a pixel value in a corresponding coordinate on the fisheye image before conversion that is associated by the above-described equations (1) to (7). Note that, a coordinate in which there is a pixel value on the fisheye image is not an integer, but a real number. Accordingly, if a coordinate in which there is no pixel value is calculated, a value obtained by interpolating a pixel value by the bicubic method is applied as the pixel value of the perspective projection image. Note that, a focal length is usually set for the perspective projection image, and in the present embodiment, a focal length is automatically set according to a size of the generated image.

In S2050, the region information drawing unit 1404 calculates the visual field region based on the viewing angle information on the angle of view of the virtual camera and superimposes and draws a rectangle indicating the calculated visual field region on the perspective projection image. In the present embodiment, in order to highlight the visual field region, a rectangle having sides at positions of minus thirty degrees to the top left and thirty degrees to the bottom right from the optical axis of the virtual camera is drawn. A Y coordinate of the top side, a Y coordinate of the bottom side, an X coordinate of the left side, and an X coordinate of the right side of the rectangle are each calculated by the equations (4) and (5). Note that, in a case when a part of the rectangle indicating the visual field region is not fit within the perspective projection image, the rectangle is deformed and drawn to be fit within the perspective projection image.

Figure 3A:
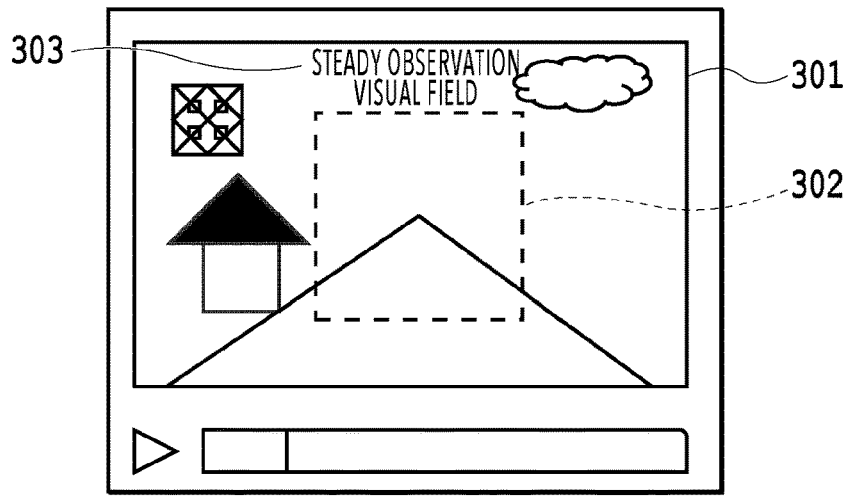
FIG. 3A is a diagram describing a user interface (UI) screen example in an embodiment 1.
Figure 3B:
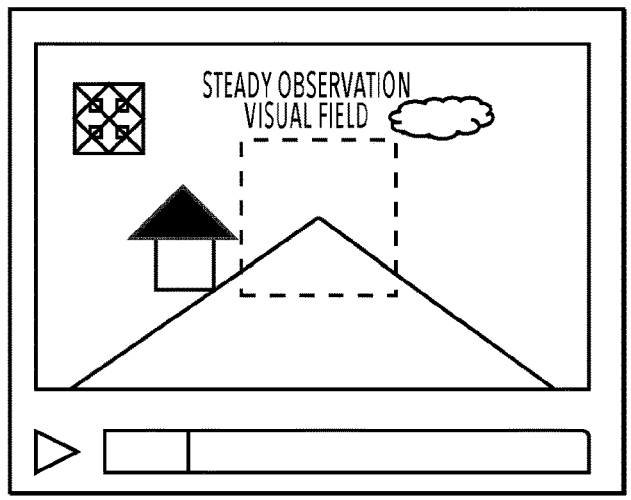
FIG. 3B is a diagram describing a UI screen example in the embodiment 1.
Figure 3C:
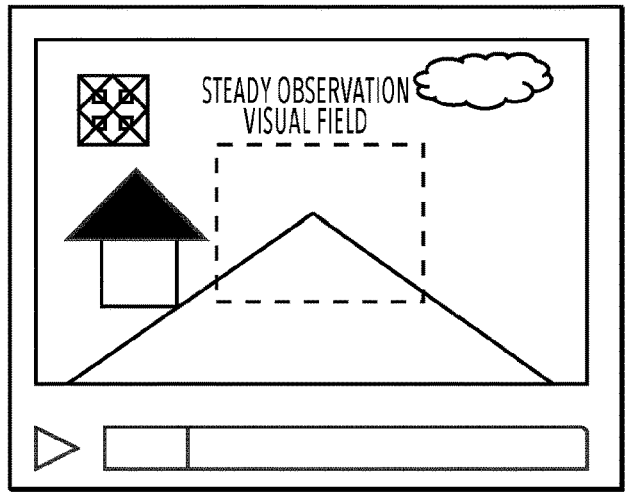
FIG. 3C is a diagram describing a UI screen example in the embodiment 1.

FIGS. 3A to 3C illustrate examples of the rectangle indicating the visual field region on the UI screen in the present embodiment. In FIGS. 3A to 3C, a perspective projection image 301, that is the image for confirmation, is displayed on the UI screen, and a rectangle 302 indicating the visual field region is drawn with a broken line in the center of the perspective projection image 301. Note that, the line drawing the rectangle 302 indicating the visual field region is not limited to a broken line and may be any line as long as it is an easily visible line such as a green continuous line. A size of the rectangle 302 indicating the visual field region is changed with respect to the perspective projection image 301 in accordance with an angle of view of a second virtual camera. In the present embodiment, however, the rectangle 302 is always drawn in a constant size in the center of the perspective projection image 301. FIG. 3A illustrates a state in which the angle of view of the virtual camera is narrow, and FIG. 3B illustrates a state in which the angle of view of the virtual camera is wide. As described above, the angle of view of the virtual camera can be changed in accordance with the angle of view of the virtual camera that is inputted by the user through the UI unit 1403.

In S2060, the region information drawing unit 1404 draws character information 303 based on the viewing angle information on the perspective projection image 301 as the image for confirmation. In the present embodiment, a character string of "steady observation viewing angle" is drawn at the top left of the rectangle indicating the visual field region using the same color as that of the rectangle. Note that, in a case when the viewing angle set based on the obtained viewing angle information is not the steady observation viewing angle, a character string in accordance with the viewing angle information such as "induced visual field" is drawn, for example.

A viewer never performs editing work such as cutting out a part of the perspective projection image. For this reason, in a case when the viewer views the perspective projection image cut out at the steady observation viewing angle, or the like, on the HMD, since the angle of view is narrower than the viewing angle of a human, the viewer can view the image without awareness of the effective visual field.

On the other hand, a person who performs imaging needs to capture an image while considering the angle of view and composition, and an editor needs to shape an image by trimming partially. Thus, in a case of confirming the cut out perspective projection image on a plane display, it is difficult to figure out whether the object fits within what degrees of angle of view. Particularly, in a case when there is a so-called zoom function to change the angle of view of the virtual camera, it is necessary to be aware of a relationship between the size of the object and the viewing angle while figuring out the current angle of view (zoom magnification), and it has been difficult to concentrate on imaging.

Thus, in the present embodiment, with the rectangle as a guide based on the predetermined viewing angle being displayed on the perspective projection image for editing and imaging, it is possible to easily fit the object within an assumed viewing angle and to perform intuitive imaging. For example, in a case of confirming the image immediately after imaging, whether the object is fit within the viewing angle can be determined based on the rectangle indicating the visual field region based on the viewing angle. Thus, if it is determined that the object is not fit within the viewing angle, it is possible to perform imaging again immediately. Conversely, it is also usable to display the object to be greater than the rectangle as the guide so as to be more powerful.

In the present embodiment, the steady observation viewing angle is obtained as the viewing angle information. It is not, however, limited thereto. For example, an arbitrary viewing angle such as the viewing angle of the typical HMD and the effective visual field may be obtained as the viewing angle information, and the viewing angle may be displayed as a numerical value with a rectangle corresponding to the viewing angle. Additionally, although the drawn character string is "steady observation visual field", it is not limited thereto, and any expression such as "steady observation viewing angle (sixty degrees)" or simply "sixty degrees" may be applied as long as it is character information on the highlighted region. Moreover, a value converted into a full-size focal length (mm) may be displayed. Furthermore, the character information may be omitted. That is, S2060 is skippable.

In the present embodiment, the rectangle indicating the visual field region is drawn assuming that the angles of view to the top and bottom and right and left are the same with respect to the line-of-sight direction of an HMD wearer. A drawing method of the rectangle, however, is not limited thereto. For example, as illustrated in FIG. 3C, as the steady observation visual field, the rectangle may be drawn at the position of minus thirty degrees to the left, thirty degrees to the right, twenty degrees to the top, and minus twenty five degrees to the bottom from the center.

In the present embodiment, descriptions are given assuming that the fisheye image of the equidistant projection having the angle of view of one hundred eighty degrees is inputted as the ultrawide-angle image. The inputted ultrawide-angle image, however, is not limited thereto. The fisheye image used as the ultrawide-angle image may be one hundred eighty degrees or less or may be greater than one hundred eighty degrees, and may be an image recorded by a projection method other than the equidistant projection. Additionally, an equidistant cylindrical image obtained by equidistant cylindrical conversion of the ultrawide-angle image may be inputted, or an omnidirectional image may be inputted. The ultrawide-angle image in the present embodiment indicates an ultrawide-angle image that allows the HMD, which is capable of head following display, to sufficiently secure the viewing angle. For example, an angle of view of a normal lens is expressed by a focal length, and if it is a wide-angle, the focal length is about eight mm (a total of the right and left angles of view is one hundred thirty degrees with a full-size sensor). This is an angle of view that is too narrow for display on the HMD that follows head movement. Note that, if the narrow angle of view is allowable, the present technique is applicable. Since the perspective projection image is generated by cutting out in an arbitrary angle direction, however, it is favorable to input a fisheye image or an omnidirectional image that can secure sufficient image quality (density of pixels) even in a wide-angle region. Additionally, even with an image of a narrow angle of view, it is possible to obtain sufficient angle of view and image quality also in a case of generating an image of an ultrawide-angle region in a pseudo manner by synthesizing and interpolating multiple images of different directions.

The present embodiment is described to be executed on the image processing apparatus having a configuration equivalent to that of a PC. It is not, however, limited thereto, and a configuration that the present embodiment is executed by an image processing unit on an image capturing device and the perspective projection image is displayed on a viewfinder and a rear display of the image capturing device.

In the present embodiment, a moving image is described as an example of the inputted ultrawide-angle image. The inputted ultrawide-angle image, however, may be a still image. Additionally, although the inputted ultrawide-angle image is described as a captured image obtained by image capturing by the image capturing device, CG may be applied as long as information on the angle of view is included.

Embodiment 2

In the embodiment 1, the perspective projection image on which the rectangle indicating the visual field region based on the viewing angle is drawn is generated from the ultrawide-angle image. In the present embodiment, however, an image on which a widget for UI is drawn is generated.

Figure 4:
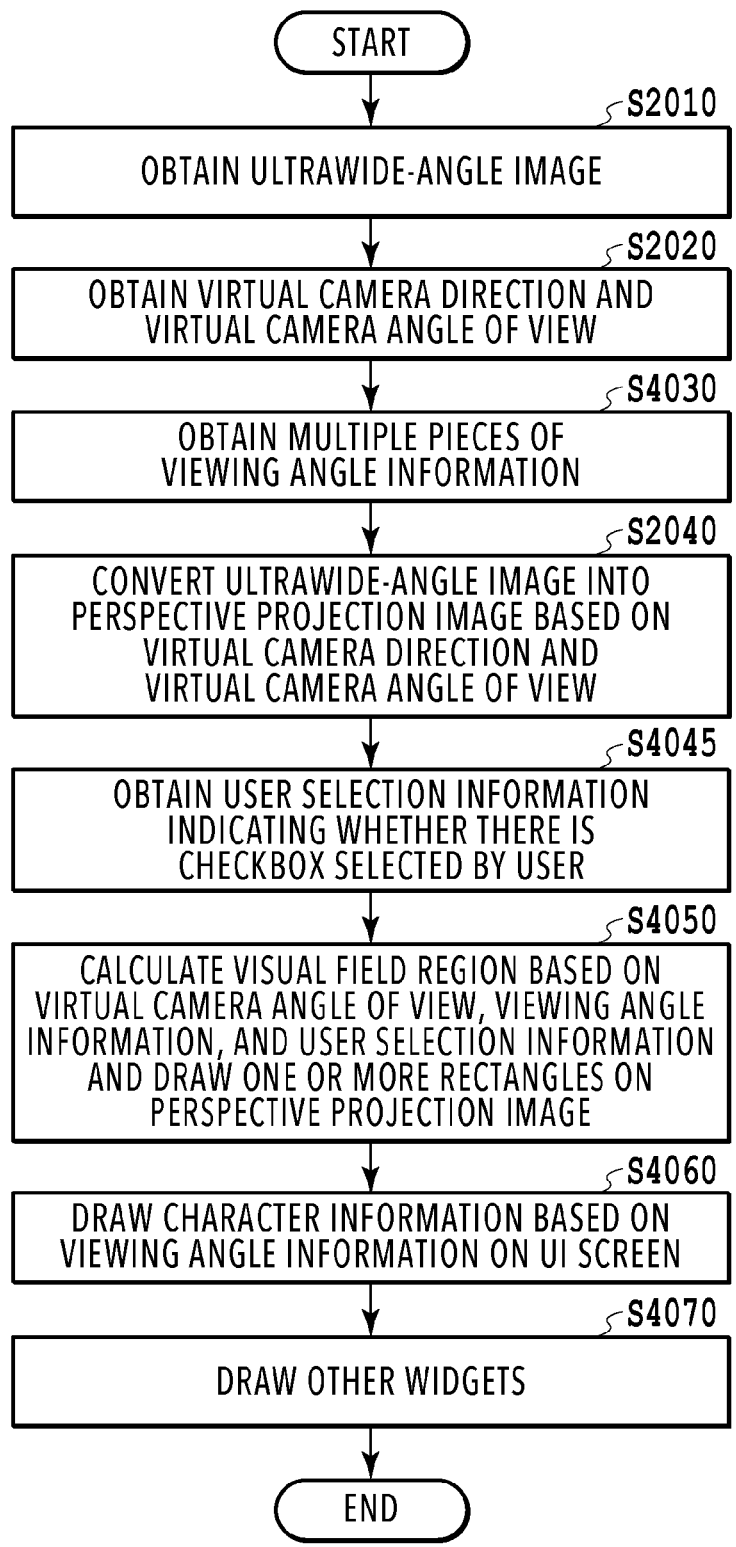
FIG. 4 is a flowchart of generating a UI screen in an embodiment 2.

FIG. 4 is a flowchart of generating a UI screen in the embodiment 2. Unless otherwise stated or changed, the descriptions are pursuant to the descriptions of FIG. 2 in the embodiment 1. The UI screen generated in the present embodiment includes a display region 501 that displays the perspective projection image and widgets such as a checkbox 502, a slider 503 that controls a play position of the perspective projection image, and a play button 504. Note that, since operations of the widgets are general, descriptions of a widget that is not related to the present technique are omitted. Note that, a default state of the later-described checkbox 502 is a state in which all the checkboxes 502 are unchecked.

In S4030, the region information obtainment unit 1402 obtains multiple pieces of the viewing angle information. In the present embodiment, the region information obtainment unit 1402 obtains information including 60 degrees (observation viewing angle), one hundred degrees (product A), one hundred ten degrees (product B), one hundred twenty degrees (product C) and information whether the checkboxes corresponding to the respective items are checked.

In S4045, the UI unit 1403 obtains user selection information indicating whether there is a checkbox selected by the user.

Figure 5:
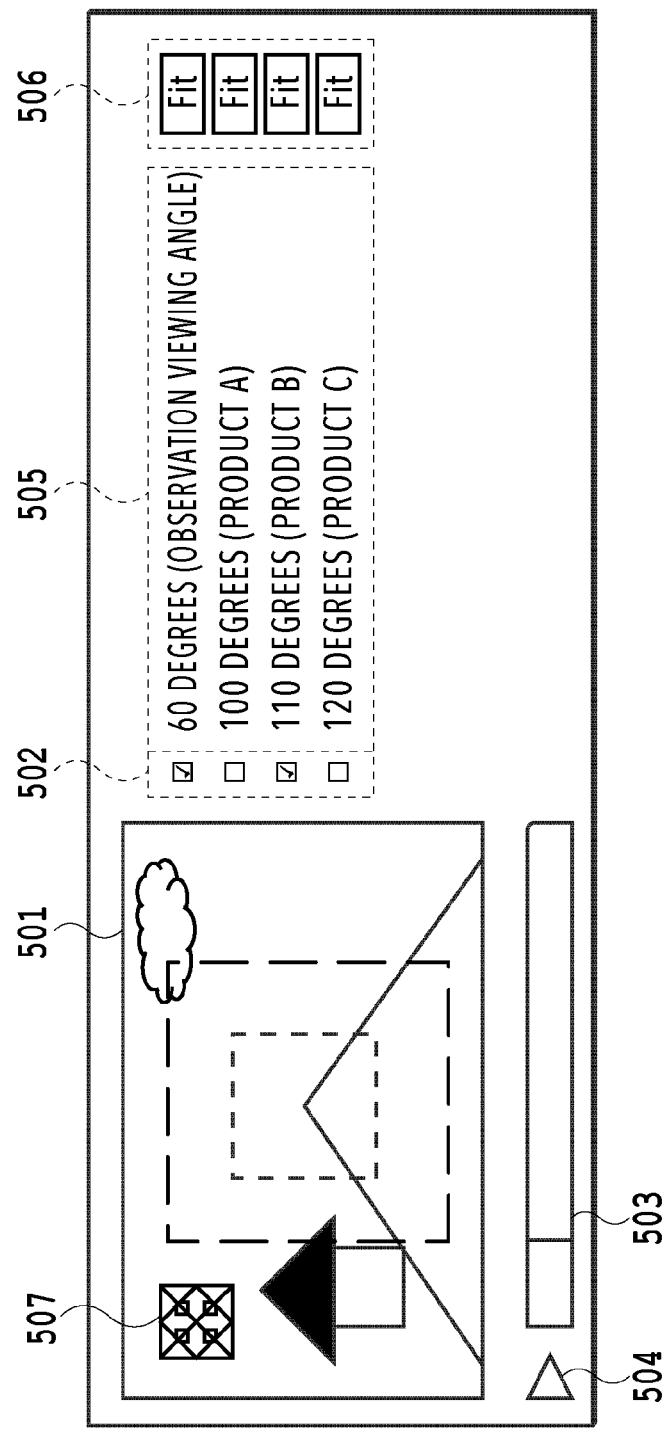
FIG. 5 is a diagram describing a UI screen example in the embodiment 2.

In S4050, the region information drawing unit 1404 calculates the visual field region based on the angle of view of the virtual camera, the viewing angle information, and the user selection information and draws one or more rectangles indicating the calculated visual field region on the perspective projection image. In the present embodiment, the region information drawing unit 1404 draws a rectangle corresponding to the viewing angle with a checked corresponding checkbox out of the obtained viewing angle information. As the drawing example, FIG. 5 illustrates a UI screen of a moving image player.

In S4060, the UI unit 1403 draws character information 505 based on the viewing angle information on the UI screen. In the present embodiment, as illustrated in FIG. 5, the character information based on the viewing angle information is not superimposed on the perspective projection image and drawn as a widget outside a display region in which the perspective projection image is displayed. In this process, the checkbox indicating whether the rectangle is drawn is checked or not checked, accordingly. Note that, a state indicating whether the checkbox is selected is kept after the present procedure ends and is able to be obtained in a case of executing the present procedure again.

In S4070, the UI unit 1403 draws the other widgets. In the present embodiment, the UI unit 1403 draws the play button 504, the slider 503 that indicates a play state of the moving image, an angle of view control button 507 that designates the angle of view of the virtual camera, and a Fit button 506 that sets the angle of view of the virtual camera so as to be fit in a window.

In the present embodiment, with the user selecting the viewing angle to be highlighted by drawing the rectangle by using the checkbox, it is possible to set the target angle and the viewing angle of the HMD, and to highlight the viewing angle thereof. Additionally, with the rectangles corresponding to multiple pieces of the viewing angle information being drawn concurrently, for example, the user can confirm the observation region, the angle of view of the HMD, and the like, while comparing on the perspective projection image on which the visual field regions of the multiple viewing angles are displayed as preview.

In the present embodiment, although four types of the viewing angle information are obtained in S4030, the number and the contents are not limited thereto. Additionally, a configuration in which the viewing angle information and the user input are obtained through the network to update the display contents may be applied.

Embodiment 3

In the embodiments 1 and 2, the rectangle indicating the visual field region is drawn while being fixed with respect to the perspective projection image. In the present embodiment, the rectangle indicating the visual field region is drawn while moving with respect to the perspective projection image so as to follow a specific object in the fisheye image as the inputted ultrawide-angle image.

Figure 6:
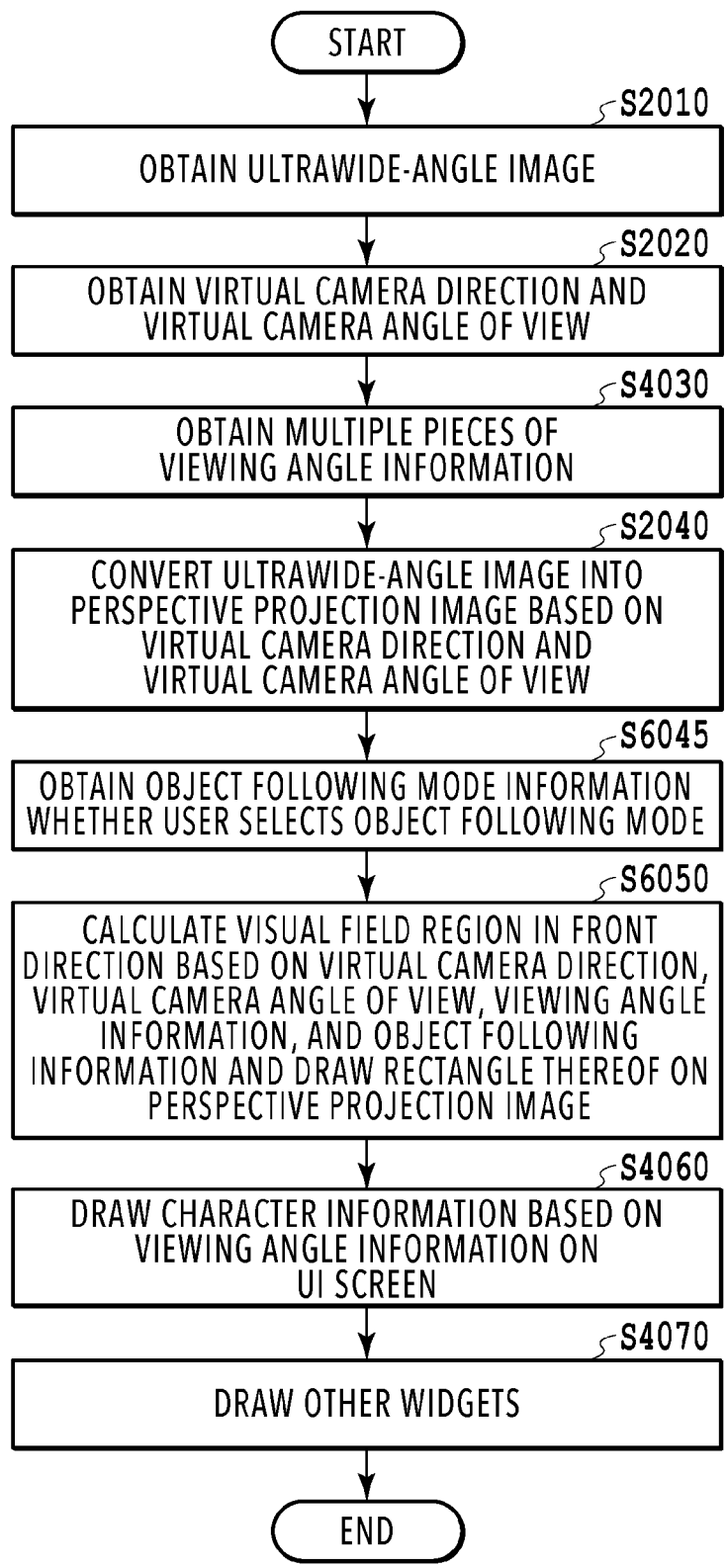
FIG. 6 is a flowchart of generating a perspective projection image in an embodiment 3.

FIG. 6 is a flowchart of generating a perspective projection image in an embodiment 3. Unless otherwise stated or changed, the descriptions are pursuant to the descriptions of FIG. 2 in the embodiment 1. Note that, the object to follow may be selected by the user each time, or a predetermined object that is determined in advance may be detected.

Figure 7:
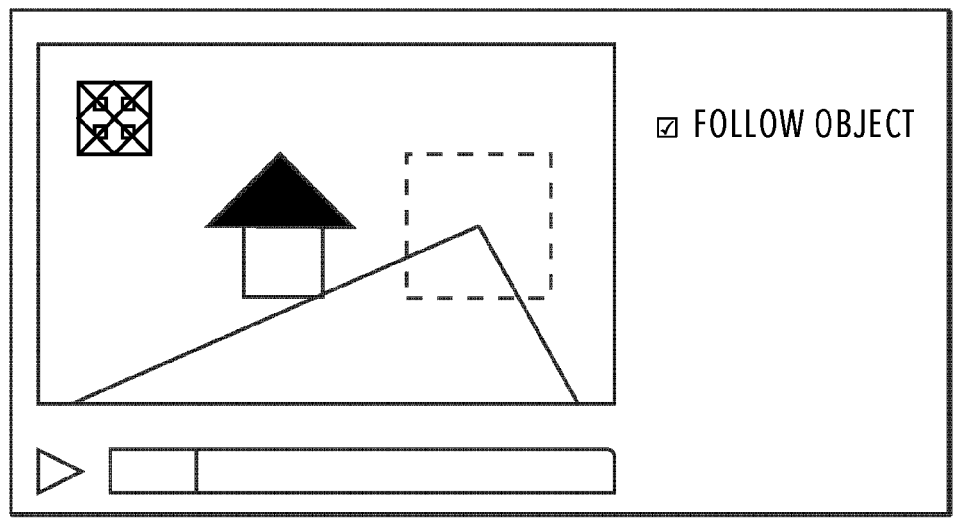
FIG. 7 is a diagram describing a UI screen example in an embodiment 3.

In S6045, the region information obtainment unit 1402 obtains object following mode information whether the user selects an object following mode. In the present embodiment, as illustrated in FIG. 7, the region information obtainment unit 1402 obtains information whether the checkbox in the UI screen is checked. FIG. 7 is a diagram describing a UI screen example in the embodiment 3.

In S6050, the region information drawing unit 1404 determines the coordinate value of the visual field region based on the optical axis direction and the angle of view of the virtual camera, the viewing angle information, and the object following information and draws the rectangle indicating the calculated visual field region on the perspective projection image. FIG. 7 illustrates a UI screen example in this case. FIG. 7 illustrates a screen example of a case when the optical axis direction (front direction) of the virtual camera is shifted to the right while the object following mode is selected as the object following information, and, accordingly, the rectangle indicating the visual field region is also drawn to be shifted to the right. In a case when the object following mode is selected, first, in order to obtain the coordinate value of the visual field region, the four coordinate values at the top left, top right, bottom left, and bottom right of the rectangle indicating the visual field region are calculated based on the coordinate value of the position of the object included in the object following information and the equations (2) and (3). Then, the top, bottom, left, and right sides of the rectangle are drawn based on the calculated coordinate values. As a calculation method in a case when the object following mode information is not selected, the optical axis direction of the virtual camera is ignored, and thus calculation is similarly performed where $(\varphi_x, \varphi_y)=(0, 0)$. An example of the perspective projection image in a case when the object following mode information is not selected, the above-described coordinate value obtainment is not performed, and the rectangle is drawn in the center of the screen is the same as that illustrated in FIGS. 3A to 3C.

In the present embodiment, with the four points of the rectangle indicating the visual field region being corrected, the rectangle is not fixed in the center of the perspective projection image and is displayed in the optical axis direction of the virtual viewpoint camera as illustrated in FIG. 7. With this, with the rectangle indicating the visual field region being drawn in the optical axis direction of the virtual camera, it is possible to provide an image that allows for easy recognition of the front viewing angle while manipulating the optical axis direction of the virtual camera with the mouse and confirming an object outside the viewing angle.

Embodiment 4

Figure 8:
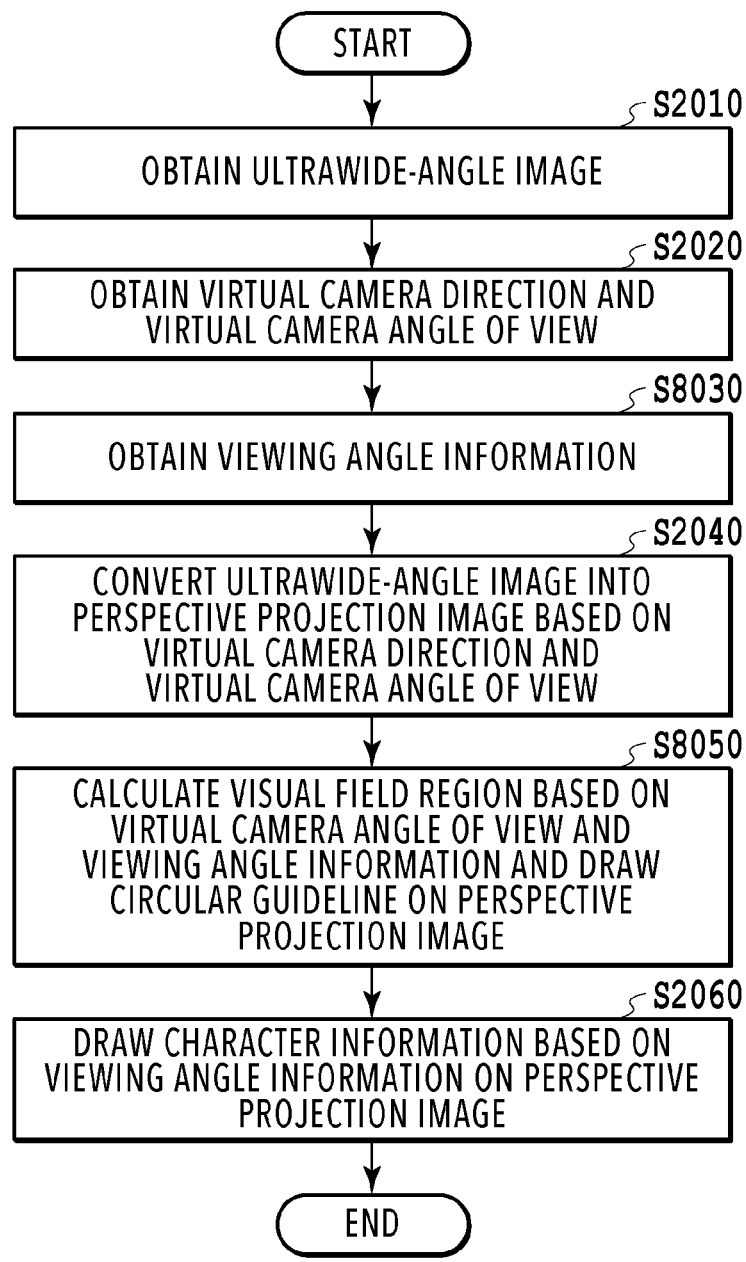
FIG. 8 is a flowchart of generating a perspective projection image in an embodiment 4.

The embodiments 1 to 3 describe an example of highlighting using the rectangle. In the present embodiment, however, a method of drawing a circular guideline by a highlighting method is described with reference to FIG. 8. FIG. 8 is a flowchart of generating a perspective image in an embodiment 4. Unless otherwise stated or changed, the descriptions are pursuant to the descriptions of FIG. 2 in the embodiment 1.

In S8030, the region information obtainment unit 1402 obtains the viewing angle information. In the present embodiment, the region information obtainment unit 1402 obtains information that a radius of the steady observation viewing angle is thirty degrees.

In S8050, the region information drawing unit 1404 calculates the visual field region based on the optical axis direction and the angle of view of the virtual camera, and the viewing angle information, and draws the circular guideline on the perspective projection image. In the present embodiment, based on the viewing angle information obtained in S8030, which is thirty degrees, a radius of the circle is obtained based on the following equation where θ=30, and the circle is drawn with the radius from the center of the perspective projection image.

$$\text{radius} = r \cdot \frac{\tan(\theta)}{\tan(\alpha)} \quad (8)$$

Figure 9A:
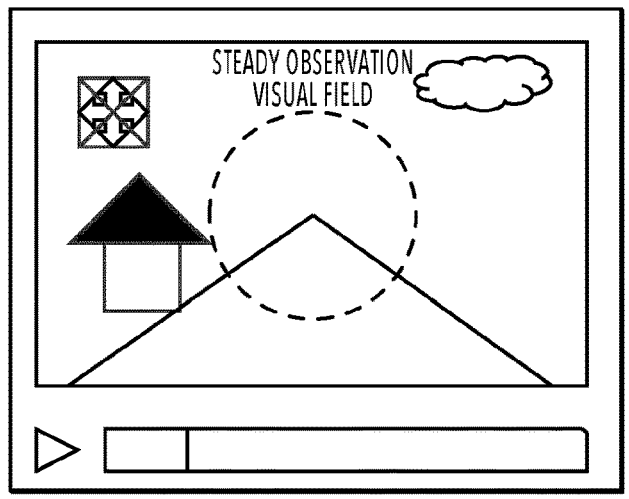
FIG. 9A is a diagram describing a UI screen example in the embodiment 4.
Figure 9B:
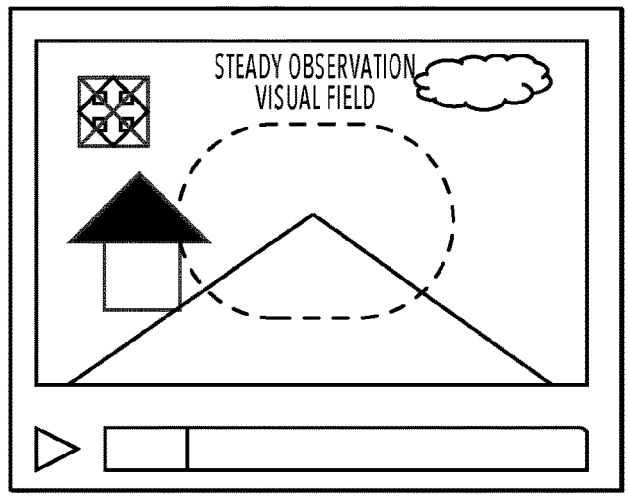
FIG. 9B is a diagram describing a UI screen example in the embodiment 4.
Figure 9C:
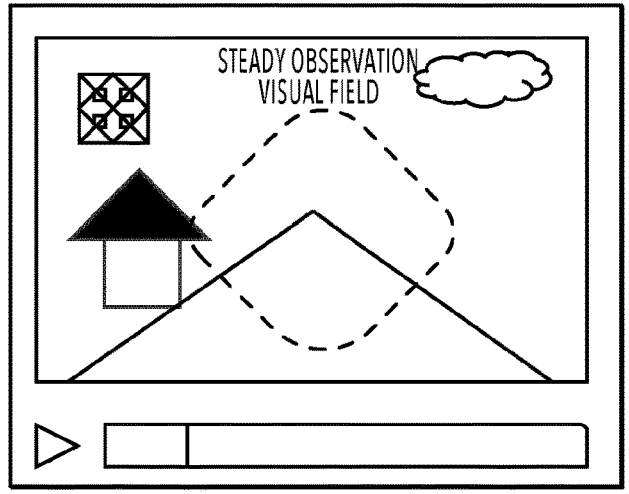
FIG. 9C is a diagram describing a UI screen example in the embodiment 4.

FIGS. 9A to 9C illustrate an example of a UI screen in this case. FIGS. 9A to 9C are diagrams describing a UI screen example in the embodiment 4. FIG. 9A is a UI screen example in which the circle described in S8050 is drawn. The viewing angle of the HMD and the viewing angle of a human are closer to a circle more than a rectangle. Accordingly, it is possible to highlight a region closer to the actual view. In the present embodiment, a perfect circle is drawn. The circle, however, is not necessarily a perfect circle and may be an ellipse, a rectangle with circular corners, a rhombus with circular corners, or a combined shape of a circle and a rectangle. For example, FIGS. 9B and 9C may be applied. Note that, in a case of seeking to replicate the visual field based on the visual feature of a human more faithfully, the region is a distorted shape compared with the shape of a rectangle or a circle. On the other hand, the distorted shape has a deteriorated design. Taking into consideration that the highlighted visual field region is only a guide, it is not about which one is right but is a problem of adjustment in a balance between faithfulness and design, and it may be determined depending on the target user.

Embodiment 5

Figure 10:
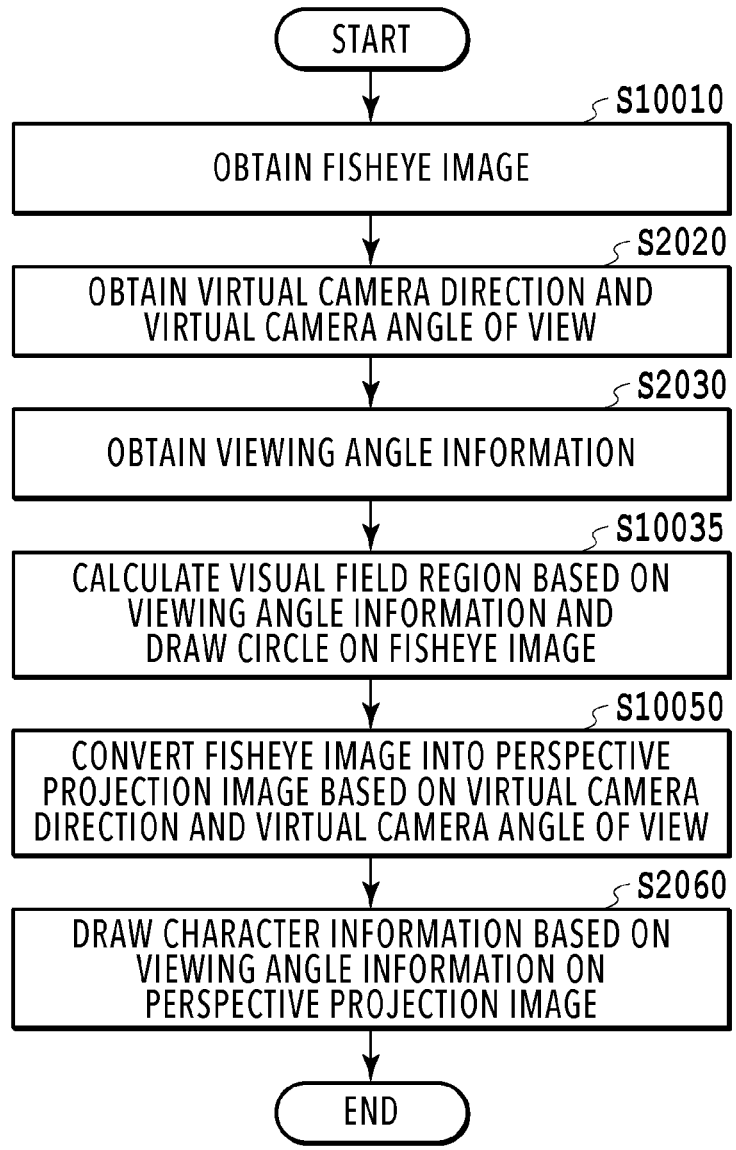
FIG. 10 is a flowchart of generating a perspective projection image in an embodiment 5.

In the present embodiment, an example of highlighting the visual field region by drawing the circle in the fisheye image is described with reference to FIG. 10. FIG. 10 is a flowchart of generating a perspective projection image in an embodiment 5. Unless otherwise stated or changed, the descriptions are pursuant to the descriptions of FIG. 2 in the embodiment 1.

In S10010, the image obtainment unit 1401 obtains the fisheye image. The operation is equivalent to that in S2010 except that the obtained image is changed.

In S10035, the region information drawing unit 1404 calculates the visual field region based on the angle of view and the viewing angle information of the virtual camera, and draws the circle indicating the visual field region on the fisheye image. The ultrawide-angle image in the present embodiment is the fisheye image, and the circle corresponding to the viewing angle based on the viewing angle information is drawn on a concentric circle about the optical axis. The circle drawn on the concentric circle of the fisheye maintains the shape of the circle still after conversion into the perspective projection image.

$$\text{radius} = r \cdot \frac{\theta}{180} \quad (9)$$

In S10050, the image conversion unit 1405 converts the fisheye image into the perspective projection image based on the optical axis direction and the angle of view of the virtual camera. The operation is the same as that in S2050. However, the circle drawn on the fisheye image is also converted.

In the present embodiment, the circle is drawn on the fisheye image instead of the perspective projection image. Thus, even if the guideline is drawn on the fisheye image instead of the perspective projection image, it is possible to obtain similar effects as that of the other embodiments.

In the present embodiment, since the ultrawide-angle image (fisheye image) on which the guideline is drawn is converted into the perspective projection image based on the optical axis direction and the angle of view of the virtual camera, the guideline is drawn in the optical axis direction of the virtual camera. That is, the guideline is drawn based on the mode of following the object that is described in the embodiment 3.

Embodiment 6

Figure 11:
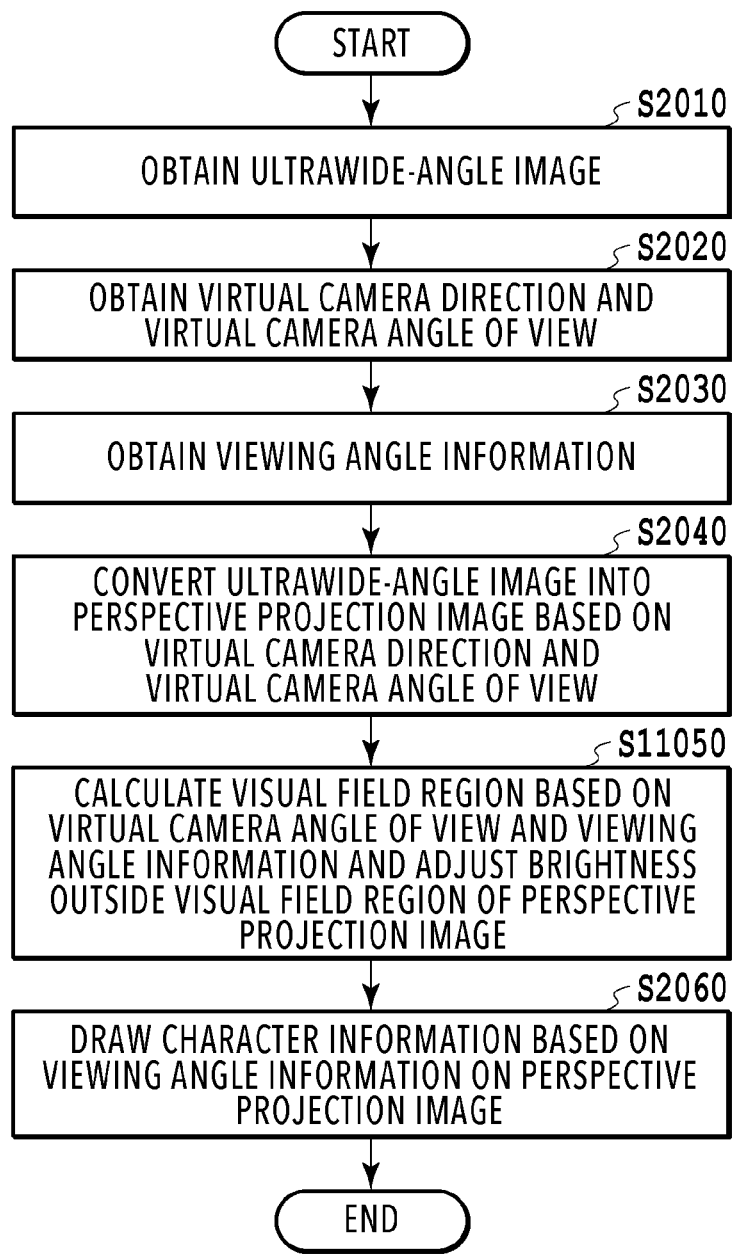
FIG. 11 is a flowchart of generating a perspective projection image in an embodiment 6.

In the present embodiment, an example of highlighting the inside of the visual field region relatively by suppressing an image region outside the visual field region is described with reference to FIG. 11. FIG. 11 is a flowchart of generating a perspective projection image in an embodiment 6. Suppressing the image in the present embodiment is to darken an image and to reduce contrast by adjusting gain and to de-emphasize a specific image region. Note that, unless otherwise stated or changed, the descriptions are pursuant to the descriptions of FIG. 2 in the embodiment 1.

In S11050, the region information drawing unit 1404 calculates the visual field region based on the angle of view of the virtual camera and the viewing angle information, and reduces brightness outside the visual field region of the perspective projection image.

According to the present embodiment, it is possible to highlight the visual field region not only by drawing the rectangle like the embodiment 1 but also by processing the image.

In the present embodiment, an example where gain is adjusted as suppression of the image region is described. It is not, however, limited thereto. For example, a method of completely blacking the outside of the visual field region may be applied. Additionally, it is also possible to suppress an image by applying a low-pass filter to the outside of the viewing angle. In this process, instead of turning on and off a low-pass filter between the inside and the outside of the visual field region, a stronger low-pass filter may be applied to the outer side of the visual field region.

In the present embodiment, a boundary between the inside and the outside of the visual field region has a rectangular shape. It is not, however, limited thereto, and the boundary may be circular as described in the embodiment 4.

Embodiment 7

Figure 12:
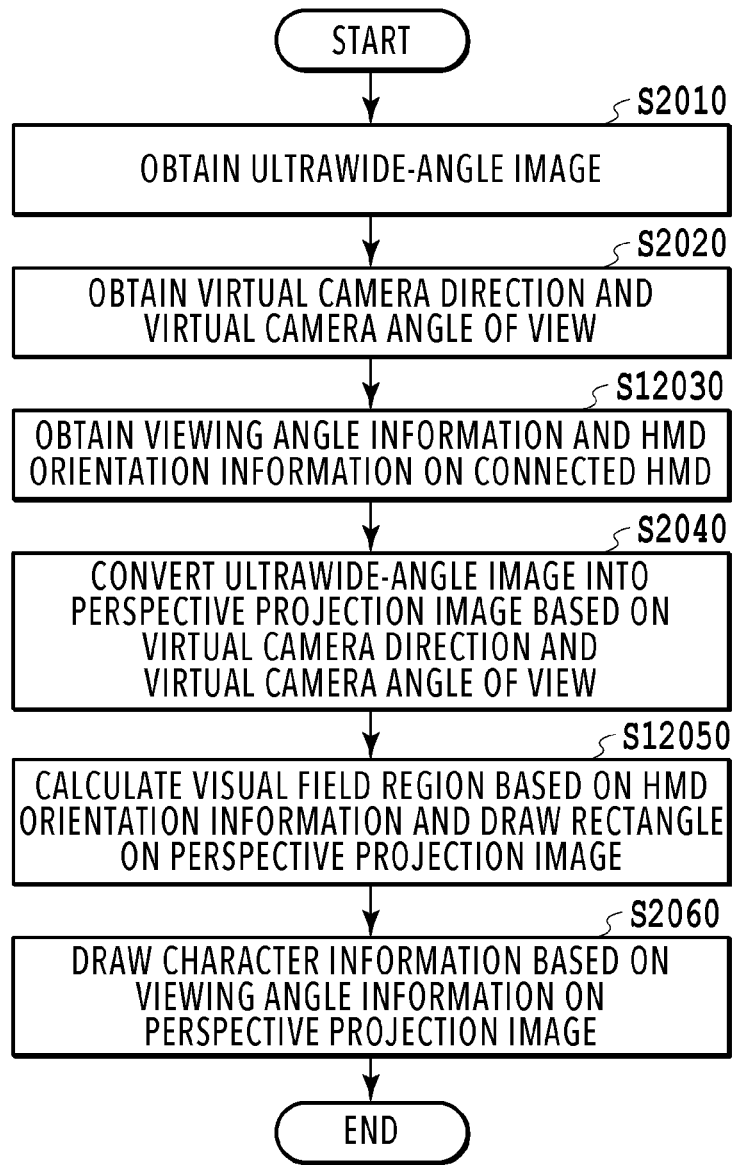
FIG. 12 is a flowchart of generating a perspective projection image in an embodiment 7.

In the present embodiment, the visual field region is displayed along with head movement of the HMD. FIG. 12 is a flowchart of generating the perspective projection image in an embodiment 7. Note that, unless otherwise stated or changed, the descriptions are pursuant to the descriptions of FIG. 2 in the embodiment 1.

In the present embodiment, the generated perspective projection image is outputted as a video to both the plane display and HMD, and the region to be displayed on the HMD is highlighted on the plane display. An image corresponding to the visual field region in the optical axis direction following head movement is displayed on the HMD, and an image in which the visual field direction is fixed is displayed on the plane display as long as there is no input from the user viewing the plane display.

In S12030, the region information obtainment unit 1402 obtains the viewing angle information and HMD orientation information on the connected HMD. In this process, based on the model name of the connected HMD, the region information obtainment unit 1402 obtains the viewing angle of the model. Note that, the viewing angle may be obtained directly without referring to the model name. For the HMD orientation information, as long as the front direction of the HMD is obtained as described later, any format may be applied with no limitation.

In S12050, the region information drawing unit 1404 calculates the visual field region based on the HMD orientation information and superimposes and draws the rectangle indicating the calculated visual field region on the perspective projection image. The HMD front direction ($\varphi'x$, $\varphi'y$) is calculated based on the HMD orientation information. In this process, using the equations (2) and (3), the four coordinates at the top left, top right, bottom left, and bottom right of the rectangle of the visual field region are calculated where ($\varphi_x$, $\varphi_y$)=($\varphi'x$, $\varphi'y$), and the top, bottom, left, and right sides of the rectangle are drawn as lines. With this, the position of the drawn rectangle is changed in accordance with head movement of the HMD.

Conventionally, in a case of concurrent output to the HMD and the plane display, usually, the image in the HMD following head movement is displayed on the plane display. The image following head movement is natural for the HMD wearer. For the user viewing by the normal plane display, however, there is a problem that the image is blurred greatly and causes sickness easily. In the present embodiment, with the perspective projection image on which the rectangle indicating the visual field region of the HMD is superimposed and drawn being displayed on the display from the UI unit 1403, it is possible to display a fixed image that does not cause sickness as the image while confirming the line-of-sight direction of the HMD wearer.

Figure 13A:
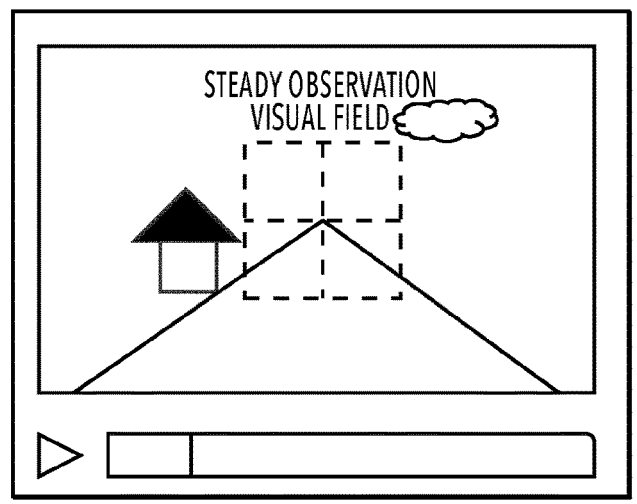
FIG. 13A is a diagram describing a screen example expressing the center of a viewpoint.
Figure 13B:
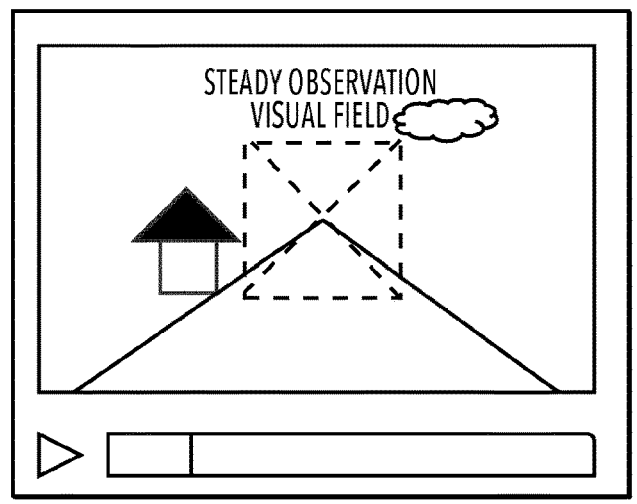
FIG. 13B is a diagram describing a screen example expressing the center of the viewpoint.
Figure 13C:
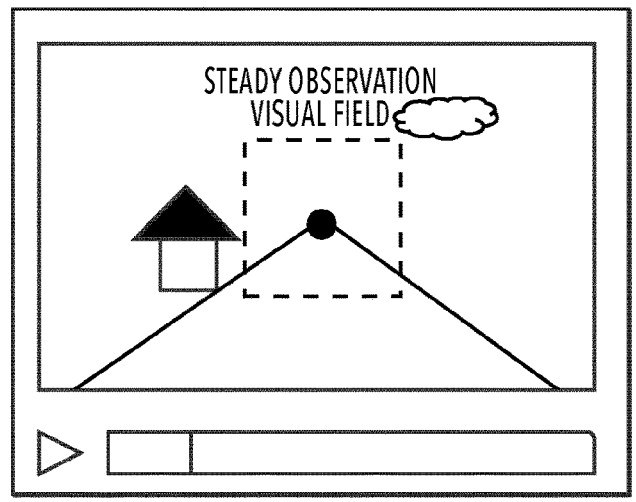
FIG. 13C is a diagram describing a screen example expressing the center of the viewpoint.

Note that, on the displayed rectangle, a cross, x, or a point with an intersection as the center of the rectangle may be drawn as illustrated in FIGS. 13A to 13C. FIGS. 13A to 13C are diagrams describing screen examples expressing the center of the viewpoint, and this can express the viewpoint direction. Note that, if there is no need to express the viewing angle, the rectangle is not necessarily drawn, and only a cross, x, or the point indicating the viewpoint direction may be drawn.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technique of the present disclosure, a perspective projection image generated from a partial image region corresponding to a predetermined angle of view of a wide-angle image is confirmed easily.

What is claimed is:

1. An image processing apparatus configured to generate a perspective projection image from a wide-angle image, the image processing apparatus comprising:
   one or more memories storing instructions; and
   one or more processors executing the instructions to function as:
   a first generation unit configured to generate the perspective projection image from the wide-angle image based on a first parameter related to a predetermined viewing angle;
   a parameter obtainment unit configured to obtain a second parameter related to the wide-angle image and a third parameter related to the perspective projection image, wherein the second parameter includes an angle of view of the wide-angle image, and the third parameter includes an angle of view of the perspective projection image and a coordinate in the wide-angle image corresponding to a criterial coordinate in the perspective projection image; and
   an output unit configured to output the generated perspective projection image, wherein the perspective projection image includes region information indicating an image region corresponding to the predetermined viewing angle in the wide-angle image,
   wherein the region information includes a frame indicating the image region corresponding to the predetermined viewing angle and the region information includes a character string indicating the viewing angle, and
   the first generation unit generates the perspective projection image from the wide-angle image based on the first parameter, the second parameter, and the third parameter.

2. The image processing apparatus according to claim 1, wherein the viewing angle is a viewing angle of a predetermined head-mounted display (HMD), and
   the region information includes a character string indicating a model of the predetermined HMD.

3. The image processing apparatus according to claim 1, wherein the wide-angle image is one of an image that is obtained based on a projection method of a fisheye lens, an equidistant cylindrical image, and an omnidirectional image.

4. The image processing apparatus according to claim 1, wherein the region information includes region information on a plurality of image regions related to a plurality of viewing angles.

5. The image processing apparatus according to claim 1, further comprising:
a coordinate value obtainment unit configured to obtain a coordinate value that designates a coordinate in the wide-angle image,
wherein the first generation unit determines a position at which the region information is superimposed in the perspective projection image based on a coordinate value obtained by the coordinate value obtainment unit.

6. The image processing apparatus according to claim 5, wherein the coordinate value obtainment unit obtains a coordinate value at which a specific object in the wide-angle image is positioned.

7. The image processing apparatus according to claim 1, wherein the first generation unit generates the perspective projection image so as to change at least one of brightness and contrast between an inside and an outside of the image region.

8. The image processing apparatus according to claim 1, further comprising:
a second generation unit configured to generate an image for a head-mounted display (HMD) by cutting out the image region based on the region information,
wherein the output unit outputs the perspective projection image and the image for the HMD to different display devices, respectively.

9. An image processing method to generate a perspective projection image from a wide-angle image, the image processing method comprising:
generating the perspective projection image from the wide-angle image based on a first parameter related to a predetermined viewing angle;
obtaining a second parameter related to the wide-angle image and a third parameter related to the perspective projection image, wherein the second parameter includes an angle of view of the wide-angle image, and the third parameter includes an angle of view of the perspective projection image and a coordinate in the wide-angle image corresponding to a criterial coordinate in the perspective projection image; and
outputting the generated perspective projection image, wherein the perspective projection image includes region information indicating an image region corresponding to the predetermined viewing angle in the wide-angle image,
wherein the region information includes a frame indicating the image region corresponding to the predetermined viewing angle and the region information includes a character string indicating the viewing angle, and
the generating generates the perspective projection image from the wide-angle image based on the first parameter, the second parameter, and the third parameter.

10. A non-transitory computer readable storage medium storing a program causing a computer to execute an image processing method to generate a perspective projection image from a wide-angle image, the image processing method comprising:
obtaining a first parameter related to a predetermined viewing angle;
generating the perspective projection image from the wide-angle image based on the first parameter;
obtaining a second parameter related to the wide-angle image and a third parameter related to the perspective projection image, wherein the second parameter includes an angle of view of the wide-angle image, and the third parameter includes an angle of view of the perspective projection image and a coordinate in the wide-angle image corresponding to a criterial coordinate in the perspective projection image; and
outputting the generated perspective projection image to a display device, wherein the perspective projection image includes region information indicating an image region corresponding to the predetermined viewing angle in the wide-angle image,
wherein the region information includes a frame indicating the image region corresponding to the predetermined viewing angle and the region information includes a character string indicating the viewing angle, and
the generating generates the perspective projection image from the wide-angle image based on the first parameter, the second parameter, and the third parameter.

* * * * *